Patented Sept. 23, 1952

2,611,772

UNITED STATES PATENT OFFICE 2,611,772

PREPARATION OF 1,4,5,8-TETRAAMINO-ANTHRAQUINONE COMPOUNDS

Charles F. H. Allen and Charles V. Wilson, Rochester, N. Y., assignors to Eastman Kodak Company, Rochester, N. Y., a corporation of New Jersey No Drawing. Application December 30, 1950, Serial No. 203,804

1 Claim. (Cl. 260—378)

This invention relates to a process for preparing anthraquinone compounds having the formula:

I

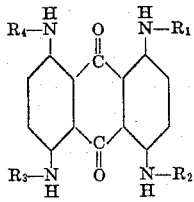

wherein $R_1$, $R_2$, $R_3$ and $R_4$ each represents an alkyl group, a hydroxyalkyl group, an alkoxyalkyl group, an N,N-dialkylaminoalkyl group, an alkylsulfonic acid group, an alkylcarboxylic acid group, an aralkyl group or a cycloalkyl group and to certain of these compounds as new products.

While certain 1,4,5,8-tetraaminoanthraquinone compounds embraced by the above formula are known many of these compounds are unknown. Work with these compounds has been restricted, at least, in part, by the fact that no satisfactory method has been devised for their preparation. We have now discovered a new and valuable process whereby the aforesaid 1,4,5,8-tetraaminoanthraquinone compounds can be readily and conveniently prepared.

In accordance with the process of our invention the 1,4,5,8-tetraaminoanthraquinone compounds having the Formula I are prepared by reacting a primary amine having the formula:

$$RNH_2$$

wherein R represents an alkyl group, a hydroxyalkyl group, an alkoxyalkyl group, an N,N-dialkylaminoalkyl group, an alkylsulfonic acid group, an alkylcarboxylic acid group, an aralkyl group or a cycloalkyl group with the leuco form of a hydroxyanthraquinone compound having the formula:

II

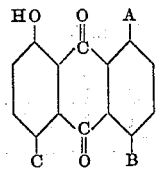

wherein A, B and C each represents a hydroxy group or an

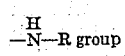

wherein R has the meaning previously assigned to it, in the absence of a substance capable of oxidizing any leuco anthraquinone compound present in the reaction mixture to its non-leuco form.

In carrying out the process of the invention air, oxygen or any other substance capable of oxidizing the leuco anthraquinone compound or compounds present in the reaction mixture, is excluded from the reaction. If any of these oxidizing substances are present the desired reaction does not go to completion. To illustrate, when leuco 1,4,5,8-tetrahydroxyanthraquinone and β-ethanolamine are reacted together in accordance with the process of our invention leuco 1,4-di-β-hydroxyethylamino - 5,8 - dihydroxyanthraquinone is first formed and then leuco 1,4,5,8-tetra-β-hydroxyethylaminoanthraquinone. However, if air is passed into the reaction mixture from the start of the reaction most of the leuco 1,4-di-β-hydroxyethylamino-5,8- dihydroxyanthraquinone formed is oxidized by the air to 1,4-di-β-hydroxyethylamino-5,8-dihydroxyanthraquinone and no further reaction of this compound with β-ethanolamine takes place. Hence, the product of the reaction is a mixture containing 1,4-di-β-hydroxyethylamino - 5,8 - dihydroxyanthraquinone and a very small amount of 1,4,5,8-tetra-β-hydroxyethylaminoanthraquinone. In contrast thereto the process of the present invention provides a smooth, easy, practical and reliable method for obtaining the aforesaid 1,4,5,8-tetraaminoanthraquinone compounds.

The term "1,4,5,8-tetraaminoanthraquinone compounds" as used herein and in the claims, unless otherwise indicated, is used in its generic sense and has reference to the 1,4,5,8-tetra(substituted amino)-anthraquinone compounds prepared in accordance with the process of the invention. It does not refer to 1,4,5,8-tetraaminoanthraquinone or to nuclear substituted 1,4,5,8-tetraaminoanthraquinone.

The 1,4,5,8 - tetraaminoanthraquinone compounds prepared in accordance with the process of the invention are useful for coloring gasoline. Further, they absorb radiations in the far red end of the spectrum. Thus, those compounds possessing suitable solubility are useful as filter dyes for absorbing infrared rays.

Primary amines that can be used in carrying out the process of the invention include, for example, methylamine, ethylamine, propylamine, isopropylamine, butylamine, secondary butylamine, amylamine, hexylamine, heptylamine, octylamine, laurylamine, octadecylamine, cetylamine, β-hydroxyethylamine, β-hydroxypropylamine, γ-hydroxypropylamine, β,γ-dihydroxypropylamine, δ-hydroxybutylamine, β-methoxyethylamine, β-ethoxyethylamine, λ-methoxypropylamine, λ-ethoxypropylamine, N,N-β-dimethylaminoethylamine, N,N - β - diethylaminoethylamine, N,N - λ - dimethylaminopropylamine, β-aminoethylsulfonic acid (i. e. taurine), λ-aminopropylsulfonic acid (i. e. H₂NCH₂CH₂CH₂SO₃H), cyclohexylamine, 3,5,5-trimethylcyclohexylamine, benzylamine and its monosulfonic acids, β-phenylethylamine and its monosulfonic acids, λ-phenylpropylamine and its monosulfonic acids, valine, β-alanine and glutamic acid. When a primary aminoalkylsulfonic acid is used, at least two carbon atoms should separate the amine group from the sulfonic acid group as the

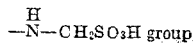
—N—CH₂SO₃H group is unstable.

In carrying out the process of the invention, an excess of the amine over that theoretically required is employed. Ordinarily, a large excess of the amine is desirable and is employed. Normally, an inert gas, usually nitrogen is employed while carrying out the process. Also as shown hereinafter, hydrogen is sometimes used while carrying out the process. Other gases, such as helium, argon, neon and krypton, inert under the conditions of operation, could be used but are impractical from an economic viewpoint. The use of an inert gas insures that no air, which would interfere with the reaction, is present. Where it is desired to use an amine that is volatile under the conditions of reaction, the reaction should be carried out in a suitable closed reaction vessel to avoid loss of the amine.

The following test can be used to determine whether or not a practically pure 1,4,5,8-tetraaminoanthraquinone compound has been obtained. The 1,4-diamino-5,8-dihydroxyanthraquinone compounds are usually pink to red in sulfuric acid, turning blue to green when boric acid is added. The 1,4,5,8-tetraaminoanthraquinone compounds, on the other hand, are usually yellow in sulfuric acid and either undergo no change or change to a dull blue-gray or green color when boric acid is added.

The following examples illustrate the invention. Parts are expressed as parts by weight.

Example 1

18 part of leuco 1,4,5,8-tetrahydroxyanthraquinone, 90 parts of β-ethanolamine and 160 parts of water were placed in a suitable reaction vessel and heated on a steam bath under refluxing conditions for 24 hours, and then for a further 24 hours in a current of air. The solid product resulting was collected on a filter, washed with methanol and dried. 26 parts, 90 per cent of the theoretical yield, of 1,4,5,8-tetra-β-hydroxyethylaminoanthraquinone were thus obtained. It melted at 302° C.–304° C. Upon recrystallization from benzyl alcohol the product melted at 316°–320° C.

Example 2

11 parts of leuco 1,4,5,8-tetrahydroxyanthraquinone, 50 parts of β-ethanolamine, and 90 parts of water were placed in a suitable reaction vessel and the reaction mixture was heated under reflux in a current of nitrogen for 12–16 hours and then for 48 hours in a current of air. The product which resulted was recovered by filtration, washed with methanol and dried. 17.4 parts, 98 per cent of the theoretical amount, of 1,4,5,8-tetra-β-hydroxyethylaminoanthraquinone were obtained. A small portion dissolved in sulfuric acid gave a greenish-yellow solution which turned dull green upon the addition of boric acid.

Example 3

10 parts of leuco 1,4,5,8-tetrahydroxyanthraquinone, 60 parts of n-amylamine and 100 parts of water were heated on the steam bath under reflux with stirring and in a current of nitrogen for 18 hours and then for 24 hours in a current of air. The stream of air was introduced at a fairly slow rate in order not to entrain too much of the amine and thus upset the equilibrium before oxidation can be completed. The crude reaction mixture was filtered and the product obtained on the filter was washed thoroughly with water and then with methanol. 15.5 parts of 1,4,5,8-tetra-n-amylaminoanthraquinone were obtained. It can be purified by recrystallization from n-butyl alcohol. It gave a pale lemon color in sulfuric acid which underwent little or no change in color when boric acid was added. The product melted at 154°–157° C.

Example 4

5 parts of leuco 1,4,5,8-tetrahydroxyanthraquinone, 50 parts of cyclohexylamine and 60 parts of water were heated together on a steam bath in a current of nitrogen for 72 hours. The nitrogen was bubbled through a wash bottle containing cyclohexylamine before entering the reaction flask. This procedure served to introduce cyclohexylamine into the reaction flask and thus replace in part that which was lost by entrainment. Air was bubbled through the reaction mixture for 24 hours while heating on the steam bath. The reaction mixture resulting was filtered and the product obtained on the filter was washed thoroughly with warm water and then with methanol. 8.6 parts of 1,4,5,8-tetracyclohexylaminoanthraquinone melting at 200° C.–205° C. were obtained. It dissolved in sulfuric acid with a yellow color and there was no change in color when boric acid was added. If desired the product can be further purified by recrystallization from a mixture of pyridine and methanol.

Example 5

5 parts of leuco 1,4,5,8-tetrahydroxyanthraquinone, 80 parts of β-methoxyethylamine and 120 parts of water were heated together on a steam bath under reflux with stirring and in a current of hydrogen for 8 hours and then for 24 hours in a current of air. The crude reaction mixture was filtered and the product collected on the filter was washed thoroughly with water and dried. 7.4 parts of 1,4,5,8-tetra-(β-methoxyethylamino)-anthraquinone were obtained. After several recrystallizations from benzene the reaction product was obtained in the form of shiny, violet leaflets which melted at 198°–200° C. The product dissolves in sulfuric acid with a yellow color which turns green on addition of boric acid.

Example 6

7 parts of leuco 1,4,5,8-tetrahydroxyanthraquinone, 60 parts of n-laurylamine, 10 parts of water and 10 parts of ethyl alcohol were heated together under reflux on a steam bath for 16 hours in a slow current of nitrogen and then for 24 hours in a current of air. 500 parts of acetone were then added to the reaction mixture and the resulting mixture was filtered. The product collected on the filter was washed well with water and dried. Upon recrystallization from pyridine 12.2 parts of 1,4,5,8-tetra-n-laurylaminoanthraquinone having a melting point of 121° C.–122° C. were obtained.

Example 7

5 parts of leuco 1,4,5,8-tetrahydroxyanthraquinone, 60 parts of n-octadecylamine, 10 parts of water and 10 parts of ethyl alcohol were heated together on a steam bath under refluxing conditions for 16 hours in a slow current of nitrogen and then for 24 hours in a current of air. Then 500 parts of acetone were added to the reaction mixture and the resulting mixture was filtered. The product collected on the filter was washed well with water and dried. Upon recrystallization from pyridine 6.2 parts of 1,4,5,8 - tetra - n-octadecylaminoanthraquinone melting at 115° C. were obtained.

Example 8

4 parts of leuco 1,4,5,8-tetrahydroxyanthraquinone and 50 parts of 3,5,5-trimethylhexylamine were heated together under refluxing conditions on a steam bath for 18 hours in a slow current of hydrogen. Then 100 parts of water were added to the reaction mixture and the reaction mixture was oxidized in a current of air. Following this the reaction mixture was acidified with acetic acid and filtered. The product collected on the filter was washed well with water and dried. Upon recrystallization from ethyl alcohol 9 parts of 1,4,5,8-tetra-(3,5,5-trimethylhexylamino)-anthraquinone were obtained as a dark blue crystalline powder. After several crystallizations from acetone the reaction product was obtained as long dark blue needles with golden luster melting at 140° C.

Example 9

120 parts of leuco 1,4,5,8-tetrahydroxyanthraquinone and 1,200 parts of water were placed in a 3-necked flask equipped with a thermometer, reflux condenser and gas inlet tube. Nitrogen was bubbled into the flask for 15 minutes and then 720 parts of N,N-γ-dimethylaminopropylamine were added, all at once, down the condenser. The reaction mixture was heated at 80° C.–90° C. for 16 hours in a current of nitrogen after which it was allowed to cool to 40° C. while stirring. The magenta-colored reaction mixture containing solid material was transferred to a pail and approximately 2,000 parts of water were used in making the transfer. Air was then bubbled through the reaction mixture with stirring for 18 hours to oxidize the leuco form of the reaction product to its non-leuco form. During the oxidation the reaction mixture became cyan-colored. The reaction mixture was then filtered and the solid collected on the filter was washed with 500 parts of cold water. The filter cake thus obtained was sucked as dry as possible and the cake thus obtained was dissolved in 3,000 parts of boiling acetone and filtered. The acetone filtrate was concentrated to about 1,000 parts and then cooled. A solid precipitate was recovered by filtration. The solid collected on the filter was washed well with water and dried. 94 parts of 1,4,5,8-tetra-(N,N-γ-dimethylaminopropylamino)-anthraquinone were obtained, melting at 119° C.–122° C. A further 14 parts of product were obtained from the mother liquor upon further concentration.

Example 10

16.5 parts of glycine, 5 parts of leuco 1,4,5,8-tetrahydroxyanthraquinone, 9 parts of sodium hydroxide and 40 parts water were heated together on a steam bath. During the first 24 hours the mixture was stirred continuously in a slow stream of nitrogen and then for 24 hours in a current of air. The reaction mixture was then diluted with 75 parts of hot water and filtered. The product was precipitated from the filtrate by adding acetone. The liquid present was removed by decantation as the product at this point was precipitated in gummy form. Trituration of this product with methanol resulted in the formation of a granular product which was collected on a filter, washed with methanol and dried. 10.4 parts of 1,4,5,8-tetra-(carboxymethylamino)-anthraquinone in the form of its tetra sodium salt were obtained. This product dissolves in sulfuric acid to which it imparts a yellow color. Addition of boric acid turns the solution dull blue. The free acid is precipitated from a water solution of the sodium salt by acidification.

Example 11

30 parts of valine, 5 parts of leuco 1,4,5,8-tetrahydroxyanthraquinone, 16.8 parts of potassium hydroxide and 75 parts of water were mixed together and heated under refluxing conditions on a steam bath for 17 hours in a current of nitrogen and then for 48 hours in a current of air. The bluish red color of the reaction mixture became blue about 15 minutes after the nitrogen was replaced by air. The reaction mixture was filtered and the desired product was precipitated from the filtrate by pouring the filtrate into 500 parts of water containing 30 parts of concentrated hydrochloric acid. The solid which precipitated was collected on a filter, washed well with water and dried. 6.4 parts of

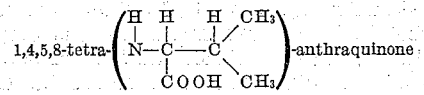

were obtained.

Example 12

10 parts of leuco 1,4,5,8-tetrahydroxyanthraquinone, 39 parts of β-alanine and 29 parts of potassium hydroxide dissolved in 80 parts of water were mixed together and heated under refluxing conditions on a steam bath for 17 hours in a current of nitrogen and then for 48 hours in a current of air. The reaction mixture thus obtained was filtered and the filtrate was added dropwise to a well-stirred, cool solution of 115 parts of concentrated hydrochloric acid and 300 parts of water. The solid which precipitated was collected on a filter, washed thoroughly with acetone and dried. 14.8 parts of 1,4,5,8-tetra(β-carboxyethylamino)-anthraquinone were obtained.

Example 13

5 parts of leuco 1,4,5,8-tetrahydroxyanthraquinone, 24 parts of glutamic acid, 12 parts of sodium hydroxide and 100 parts of water were heated under reflux on a steam bath for 15 hours in a slow current of hydrogen and then for 8 hours in a current of air. The reaction mixture thus obtained was heated with 800 parts of methanol and the solid which precipitated was collected on a filter. 6 parts of 1,4,5,8-tetra-(α,γ-dicarboxypropylamino)-anthraquinone were obtained as a dark blue powder. This compound dissolves readily in water, acetic acid and ethylene glycol with a greenish blue color. It is practically insoluble in all other conventional organic solvents. It can be purified from excess glutamic acid by dissolving in a small amount of water and treating with excess pyridine.

Example 14

4 parts of leuco 1,4,5,8-tetrahydroxyanthraquinone, 48 parts of β-phenylethylamine and 20 parts of water were heated together under refluxing conditions with stirring for 16 hours in a current of nitrogen and then for 24 hours in a current of air. The violet-colored reaction mixture turned greenish blue after air had been bubbled through 16 hours. The reaction product was recovered by filtration, washed thoroughly with hot water and dried. 6 grams of 1,4,5,8-tetra-(β-phenylethylamino)-anthraquinone were thus obtained. Upon recrystallization from acetone the product was obtained in the form of blue needles melting at 178° C.

Example 15

27.3 parts of taurine, 5 parts of leuco 1,4,5,8-tetrahydroxyanthraquinone, 9.1 parts of sodium hydroxide and 75 parts of water were heated together on a steam bath in a flask equipped with a reflux condenser and a gas inlet tube through which a current of nitrogen was bubbled for 16 hours. Then a current of air was bubbled through the reaction mixture for 24 hours while heating on the steam bath. The resulting reaction mixture was treated with sufficient methanol to precipitate the desired product which was recovered by filtration, washed thoroughly with methanol and dried. 11 parts of 1,4,5,8-tetra-(β-sulfo-ethylamino)-anthraquinone in the form of its tetra sodium salt were thus obtained. The product is yellow in sulfuric acid and turns blue on the addition of boric acid.

Just sufficient sodium hydroxide to convert the taurine to its sodium salt form was employed. By the use of an equivalent amount of potassium hydroxide in place of sodium hydroxide the potassium salt form of the product can be obtained. Also, it is to be noted that taurine can be used in its sodium or potassium salt form in which case no sodium hydroxide or potassium hydroxide is employed in the reaction. The manner in which other salt forms, such as the ammonium and the lithium salt forms, for example, and the free acid form are obtained is believed to be clear to those skilled in the art and no further discussion with respect thereto is thought to be necessary.

Inasmuch as the oxidation of the leuco compound to its non-leuco form proceeds very well using air the use of other oxidizing agents has not been disclosed in the examples. Oxygen as free oxygen could also be used. Other oxidizing agents well known to those skilled in the art could probably be used. The suitability of any particular oxidizing agent is readily determinable.

As previously indicated the 1,4,5,8-tetraaminoanthraquinone compounds made in accordance with the process of the invention absorb infrared rays, the peak of the absorption coming at about 720 to 760 millimicrons.

We claim:

The anthraquinone compound having the formula:

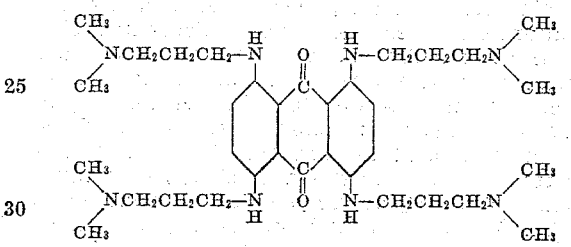

CHARLES F. H. ALLEN.
CHARLES V. WILSON.

REFERENCES CITED

The following references are of record in the file of this patent:

UNITED STATES PATENTS

| Number | Name | Date |
| --- | --- | --- |
| 1,911,316 | Hauser et al. | May 30, 1933 |
| 1,976,167 | Grossmann | Oct. 9, 1934 |
| 2,091,481 | Kranzlein et al. | Aug. 31, 1937 |
| 2,128,307 | Lord et al. | Aug. 30, 1938 |
| 2,205,191 | Flaks | June 18, 1940 |